US010641661B2

(12) United States Patent
Ganguly et al.

(10) Patent No.: US 10,641,661 B2
(45) Date of Patent: May 5, 2020

(54) PROCESS CONTROL USING NON-INVASIVE PRINTED PRODUCT SENSORS

(71) Applicants: IMA LIFE NORTH AMERICA INC., Tonawanda, NY (US); PURDUE RESEARCH FOUNDATION, West Lafayette, IN (US)

(72) Inventors: Arnab Ganguly, Williamsville, NY (US); Ernesto Renzi, Youngstown, NY (US); Francis W. Demarco, Niagara Falls, NY (US); Nithin Raghunathan, West Lafayette, IN (US); Dimitrios Peroulis, West Lafayette, IN (US)

(73) Assignee: IMA LIFE NORTH AMERICA INC., Tonawanda, NY (US)

( * ) Notice: Subject to any disclaimer, the term of this patent is extended or adjusted under 35 U.S.C. 154(b) by 147 days.

(21) Appl. No.: 15/544,592

(22) PCT Filed: Jan. 27, 2016

(86) PCT No.: PCT/US2016/015047
§ 371 (c)(1),
(2) Date: Jul. 19, 2017

(87) PCT Pub. No.: WO2016/123177
PCT Pub. Date: Aug. 4, 2016

(65) Prior Publication Data
US 2018/0274986 A1    Sep. 27, 2018

Related U.S. Application Data

(60) Provisional application No. 62/108,589, filed on Jan. 28, 2015, provisional application No. 62/267,418, (Continued)

(51) Int. Cl.
*G01K 13/00* (2006.01)
*G01K 7/02* (2006.01)
(Continued)

(52) U.S. Cl.
CPC ............... *G01K 7/028* (2013.01); *B65D 1/09* (2013.01); *F26B 5/06* (2013.01); *G01K 1/024* (2013.01);
(Continued)

(58) Field of Classification Search
CPC ............ G01K 7/02; G01K 1/14; G01K 13/02; G01K 13/00; G01K 1/143; G01K 7/00;
(Continued)

(56) References Cited

U.S. PATENT DOCUMENTS 2,246,563 A * 6/1941 Winters ................ G01F 23/247
196/132
4,304,120 A * 12/1981 Myers ................ G01N 33/0011
374/143
(Continued)

FOREIGN PATENT DOCUMENTS

CA    1167091 A * 5/1984
CA    2776612 A1 * 11/2012 ............. G01D 4/004
(Continued)

OTHER PUBLICATIONS

Sam Duby et al., Printed Thermocouple Devices, Brunel University, Surry, UK, available on line at http://citeseerx.ist.psu.edu/viewdoc/download?doi=10.1.1.426.5220&rep=rep1&type=pdf (IEEE 2012).
(Continued)

*Primary Examiner* — Gail Kaplan Verbitsky

(57) ABSTRACT

An arrangement for monitoring a freeze drying process includes product condition sensors for product condition measurement within product vials. The product condition sensors are bimetal junctions deposited on a substrate using an ink jet printing process. The substrate may be a flexible film applied to an interior surface of the product vial, or may be the vial surface itself. The bimetal junction may be printed using a roll-roll inkjet printing process with metallic
(Continued)

nanoparticle inks. Multiple closely-spaced bi-metal junctions are provided in each measurement vial. Data from the sensors is transmitted to a data collection point via short range wireless digital communications. The location of a sublimation front may be calculated for each measured vial, and the freeze drying process may be controlled using the data.

23 Claims, 10 Drawing Sheets

Related U.S. Application Data filed on Dec. 15, 2015, provisional application No. 62/172,829, filed on Jun. 9, 2015.

(51) Int. Cl.
   *G01K 1/02*    (2006.01)
   *F26B 5/06*    (2006.01)
   *B65D 1/09*    (2006.01)

(52) U.S. Cl.
   CPC ......... *G01K 1/026* (2013.01); *G01K 2213/00* (2013.01)

(58) Field of Classification Search
   CPC ............... G01K 1/024; G01K 2201/00; G01K 2211/00; G01K 2213/00; G01N 27/123
   USPC ..................................................... 340/870.17
   See application file for complete search history.

(56) References Cited

U.S. PATENT DOCUMENTS

| | | | |
|---|---|---|---|
| 4,716,492 A | 12/1987 | Charboneau | |
| 4,969,956 A | 11/1990 | Kreider | |
| 5,240,177 A * | 8/1993 | Muramatsu | G05D 22/02 236/44 C |
| 5,251,981 A * | 10/1993 | Kreider | G01K 1/18 136/225 |
| 5,447,374 A * | 9/1995 | Fraser | B01L 3/50825 215/227 |
| 5,615,953 A * | 4/1997 | Moskal | G01N 25/72 134/167 C |
| 5,820,266 A * | 10/1998 | Fedak | G01K 1/026 374/179 |
| 6,575,623 B2 * | 6/2003 | Werneth | A61B 5/01 374/148 |
| 6,615,658 B2 * | 9/2003 | Snelling | G01F 23/247 340/622 |
| 7,034,689 B2 * | 4/2006 | Teplitxky | B65D 55/06 340/572.1 |
| 8,117,005 B2 * | 2/2012 | Barresi | F26B 5/06 374/137 |
| 8,176,844 B2 * | 5/2012 | Lichte | A47J 39/003 219/400 |
| 8,215,835 B2 * | 7/2012 | Hyde | A61J 1/165 374/208 |
| 8,534,556 B2 | 9/2013 | Drzymala | |
| 9,127,597 B2 * | 9/2015 | Masiello | F02C 9/28 |
| 9,786,829 B2 * | 10/2017 | Grande | G01K 13/002 |
| 10,052,633 B2 * | 8/2018 | Kantor | B01L 9/06 |
| 2001/0008238 A1 * | 7/2001 | Witonsky | A61J 9/02 219/729 |
| 2002/0116954 A1 * | 8/2002 | Terrell, Jr. | C03B 37/029 65/384 |
| 2005/0015175 A1 | 1/2005 | Huang | |
| 2006/0239331 A1 | 10/2006 | Schwegman | |
| 2008/0083275 A1 * | 4/2008 | Bremmer | G01F 23/246 73/295 |
| 2008/0239478 A1 | 10/2008 | Tafas | |
| 2009/0001042 A1 | 1/2009 | Sever | |
| 2009/0175315 A1 | 7/2009 | Schwegman | |
| 2009/0276179 A1 | 11/2009 | Barresi | |
| 2010/0167412 A1 * | 7/2010 | Xiao | B01L 3/0275 436/171 |
| 2010/0282762 A1 * | 11/2010 | Leonard | A61J 1/165 220/592.01 |
| 2011/0247234 A1 | 10/2011 | Friess | |
| 2011/0227803 A1 | 11/2011 | Grande | |
| 2012/0000918 A1 * | 1/2012 | Deane | B65D 81/3802 220/592.2 |
| 2012/0012069 A1 * | 1/2012 | Hempstead | A01K 11/004 119/712 |
| 2012/0192447 A1 | 8/2012 | Thompson, Jr. | |
| 2012/0215373 A1 * | 8/2012 | Koblenz | G05D 23/1919 700/300 |
| 2012/0294328 A1 | 11/2012 | Mujat | |
| 2012/0321783 A1 * | 12/2012 | Hampden-Smith | B41M 1/22 427/162 |
| 2013/0270142 A1 * | 10/2013 | Yao | B65D 25/00 206/459.1 |
| 2014/0055244 A1 * | 2/2014 | Burchell | G01K 1/024 340/10.1 |
| 2014/0230472 A1 | 8/2014 | Coradetti | |
| 2014/0352329 A1 | 12/2014 | Bloedow | |
| 2014/0373382 A1 | 12/2014 | Ling | |
| 2015/0013347 A1 * | 1/2015 | Walls | F25B 21/04 62/3.3 |
| 2015/0323391 A1 * | 11/2015 | McCulloch | G05D 23/1931 374/185 |
| 2015/0363686 A1 * | 12/2015 | Yang | G06K 19/07773 235/492 |
| 2016/0316516 A1 * | 10/2016 | Koebrich | A47J 27/004 |
| 2018/0033942 A1 * | 2/2018 | Grande | G01K 13/002 |
| 2018/0153454 A1 * | 6/2018 | Hayter | A61B 5/01 |

FOREIGN PATENT DOCUMENTS

| | | | | |
|---|---|---|---|---|
| CN | 1425124 A | | 6/2003 | |
| CN | 201488828 U | | 5/2010 | |
| CN | 201828949 U | | 5/2011 | |
| CN | 202016996 U | * | 10/2011 | |
| CN | 102908930 A | * | 2/2013 | |
| CN | 203224894 U | * | 10/2013 | |
| CN | 203329034 U | * | 12/2013 | |
| CN | 104099245 A | * | 10/2014 | |
| CN | 204305061 U | * | 4/2015 | |
| CN | 205291834 U | * | 6/2016 | |
| EP | 0034538 A2 | * | 8/1981 | ............. H01L 35/08 |
| EP | 2034263 A1 | | 3/2009 | |
| EP | 3388765 A1 | * | 10/2018 | ........... F25D 23/064 |
| KR | 101220327 B1 | * | 1/2013 | |
| KR | 20140076306 A | * | 6/2014 | |
| WO | 2006/092885 A1 | | 9/2006 | |
| WO | 2009/030760 A1 | | 3/2009 | |
| WO | 2011/116303 A1 | | 9/2011 | |
| WO | 2013/147759 A1 | | 10/2013 | |

OTHER PUBLICATIONS

Marco Parvis et al., Sputtered Thermocouple for Lyophilization Monitoring, IEEE 978-1-4577-1772-7/12 (2012).
Sigma-Aldrich Specification Sheet, "Silver nanoparticle Ink" (printed from Web Sep. 2, 2015).
MatWeb Material Property Data Sheet for "Gwent Electronic Materials C2031105D2 Palladium Ink" (printed from Web Sep. 2, 2015).
Yasui Seiki flyer "Non-Silicone Release Film—Laminated Polypropylene Film-" (printed from Web Sep. 2, 2015).

* cited by examiner

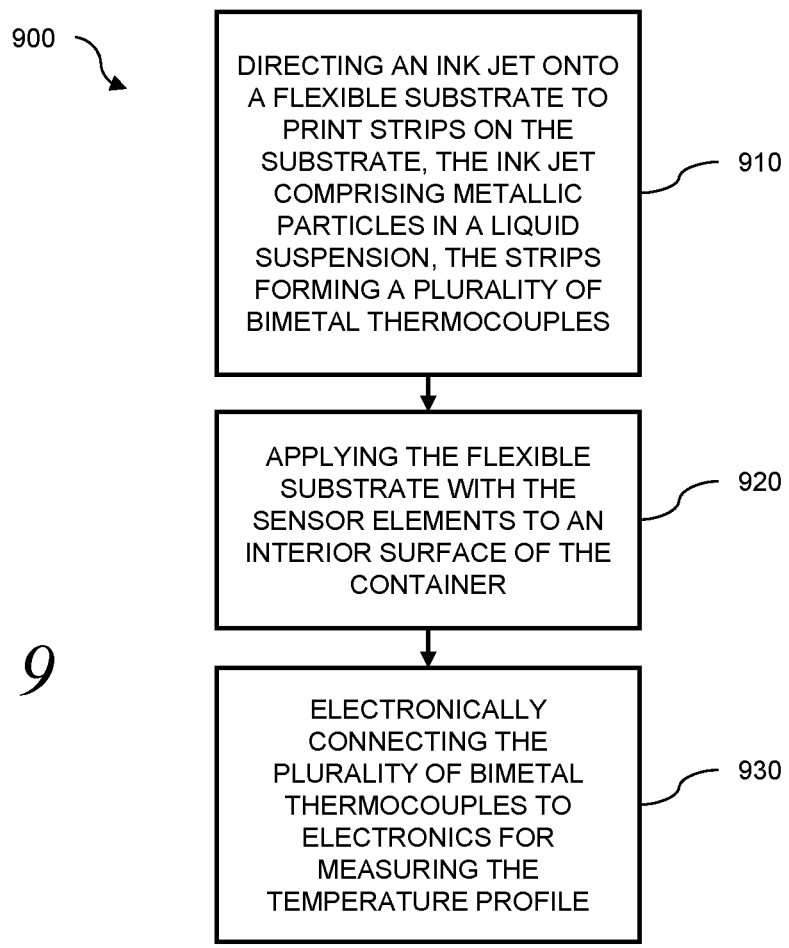

PROCESS CONTROL USING NON-INVASIVE PRINTED PRODUCT SENSORS

PRIORITY CLAIM

This application claims the benefit of U.S. Provisional Application No. 62/108,589, filed Jan. 28, 2015, entitled "PROCESS MONITORING AND CONTROL USING BATTERY-FREE MULTIPOINT WIRELESS TEMPERATURE SENSING," and claims the benefit of U.S. Provisional Application No. 62/172,829, filed Jun. 9, 2015, entitled "PROCESS MONITORING AND CONTROL USING BATTERY-FREE MULTIPOINT WIRELESS PRODUCT CONDITION SENSING," and claims the benefit of U.S. Provisional Application No. 62/267,418, filed Dec. 15, 2015, entitled "PROCESS MONITORING AND CONTROL USING NON-INVASIVE PRINTED PRODUCT CONDITION SENSORS," each of which is incorporated by reference herein.

FIELD OF THE INVENTION

The present invention relates to freeze drying processing and equipment for handling an aseptic product under tightly controlled process conditions. More specifically, the invention relates to the measurement and monitoring of an aseptic process such as a freeze drying process, especially for products such as pharmaceutical products.

BACKGROUND

Pharmaceutical manufacturing processes are typically carried out in carefully controlled environments. Conditions within those environments must be closely monitored. Those conditions include temperature as measured both within the product being processed and at selected locations within the controlled environment.

Freeze drying is a process that removes a solvent or suspension medium, typically water, from a product. Other solvents, such as alcohol, may also be removed in freeze drying processes.

In a freeze drying process for removing water, the water in the product is frozen to form ice and, under vacuum, the ice is sublimed and the vapor flows out of the product and towards a condenser. The water vapor is condensed on the condenser as ice and is later removed from the condenser. Freeze drying is particularly useful in the pharmaceutical and bio-pharmaceutical industries, as the integrity of the product is preserved during the freeze drying process and product stability can be guaranteed over relatively long periods of time. The present disclosure is also applicable to the food industry and other industries with similar requirements. The freeze dried product is ordinarily, but not necessarily, a biological substance.

Pharmaceutical freeze drying is often an aseptic process that requires sterile and carefully controlled conditions within a product drying chamber. It is critical to assure that all components of the freeze drying system coming into contact with the product are sterile.

Most freeze drying under aseptic conditions is done in a freeze dryer designed for vials, wherein product is contained in vials placed on trays or shelves. In one example of a prior art freeze drying system 100 shown in FIG. 1, a batch of product is placed in vials 112 arranged on freeze dryer trays 121 within a product drying chamber 110. Freeze dryer shelves 123 are used to support the trays 121 and to transfer heat to and from the trays and the product as required by the process. A heat transfer fluid flowing through conduits within the shelves 123 is used to remove or add heat. The product is initially cooled to freeze the solvent within the product, forming a frozen product.

The product drying chamber is then evacuated using a vacuum pump 150. Under vacuum, the frozen product in the vials 112 is heated slightly to cause sublimation of the ice within the product. Water vapor resulting from the sublimation of the ice flows through a passageway 115 into a condensing chamber 120 containing condensing coils or other surfaces 122 maintained below the condensation temperature of the water vapor. A coolant is passed through the coils 122 to remove heat, causing the water vapor to condense as ice on the coils.

Both the product drying chamber 110 and the condensing chamber 120 are maintained under vacuum during the process by the vacuum pump 150 connected to the exhaust of the condensing chamber 120. Non-condensable gases contained in the chambers 110, 120 are removed by the vacuum pump 150 and exhausted at a higher pressure outlet 152.

As the freeze drying process progresses, a sublimation front forms in each vial and moves from the exposed top surface of the product to the bottom of the vial. The sublimation front defines a boundary between freeze dried product above the front, and frozen product containing frozen solvent below the front. In an individual vial, the freeze drying process is complete when the sublimation front reaches the bottom of the vial.

Accurately and non-invasively monitoring product attributes such as temperature during and after the process with minimal bias from the monitoring sensor is critical to process development and to work related to process scale-up, especially in the pharma/bio-pharmaceutical industry. For example, the ability to control product temperature below a critical value is essential for a successful batch of freeze-dried product. However, introducing a monitoring probe into the product contained in a processing vial may bias characteristics of the product in that vial, making the vial atypical of the rest of the batch. Specifically, the physical presence of self-supporting thermocouple probes in the measured vials alters the thermal conditions in those vials. For example, self-supporting probes containing bimetal thermocouples have a different thermal conductivity and a different heat capacity from the surrounding frozen product. The thermal characteristics of a probe furthermore remain constant, while those of the surrounding product change as frozen solvent in the product sublimes. Measurements from those probes are therefore approximations of the thermal conditions in neighboring vials that do not contain probes.

In existing systems, the product temperature is typically monitored by using wired thermocouple probes that are connected to electrical ports provided in the product drying chamber for that purpose. Because of the variation in heat transfer among the multiple shelves on which the product vials are placed, the product attributes, including temperature, are position-dependent within the product drying chamber. To monitor temperature in an existing system, multiple (typically 8-16) single-point self-supporting probes are placed in separate, selected vials in a development cycle to understand that positional variation. Such a setup, with multiple sensor wires across the vials placed in the product chamber, can be cumbersome to handle and can sometimes lead to product loss and/or errors in data collection.

Wireless, induction-based sensors that wirelessly communicate with a data acquisition system are also used. The induction-based probes have a typical sensing junction size of approximately 1.5 cm×0.5 cm.

There is a need for an improved technique for monitoring product conditions both during the development of a freeze drying process and during production. The technique should be non-invasive, permitting measurements of product conditions without changing those conditions, and should utilize inexpensive, easily fabricated sensors. The technique should furthermore eliminate the potential errors and process disruption caused by wired probes. The technique should maximize measurement resolution within the volume of the product drying chamber and within the vial. The technique should provide real time data that may be used in controlling the freeze drying process.

SUMMARY

The present disclosure addresses the needs described above by providing a container apparatus for processing a product. The apparatus includes a product containment vial having an interior surface defining a product containment space in communication with an exterior of the product containment vial via a vial opening. The apparatus further includes a plurality of product condition sensors located on the interior surface of the product containment vial for measuring a condition profile of the product within the product containment space, the product condition sensors each comprising metallic particles in a dried ink suspension deposited as at least one strip on a substrate.

Another aspect of the present disclosure is a method for preparing a container for measuring a temperature profile in a product contained in the container. In the method, an ink jet is directed onto a flexible substrate to print strips on the substrate, the ink jet comprising metallic particles in a liquid suspension, the strips forming a plurality of bimetal thermocouples. The flexible substrate with the sensor elements is applied to an interior surface of the container. The bimetal thermocouples are electronically connected to electronics for measuring the temperature profile.

A further aspect of the present disclosure is a system for aseptic processing of a product. The system includes a processing chamber including an arrangement for supporting a plurality of product vials, and a measurement product vial assembly. The measurement product vial assembly comprises a measurement product vial for containing a portion of the product, a product condition sensor attached to an inside surface of the measurement product vial for measuring a condition of the product in the measurement product vial, the product condition sensor comprising first and second metallic strips comprising metal-containing inks printed on a substrate, a processor connected for receiving measurements by the product condition sensor and transmitting measurement data via a local wireless network, and a radio frequency energy harvesting board connected for powering the processor using a received wireless powering signal.

The system also includes a radio frequency power transmission system for powering the radio frequency energy harvesting board within the processing chamber via the wireless powering signal, and a wireless communications transceiver configured for communications with the processor via the local wireless network.

The respective features of the exemplary embodiments of the disclosure may be applied jointly or severally in any combination or sub-combination.

BRIEF DESCRIPTION OF THE DRAWINGS

FIG. 9 is a flow chart showing another method in accordance with another aspect of the disclosure.

DESCRIPTION

Presently disclosed are systems and methods using product condition sensors incorporating printed bi-metal sensing systems that act as thermocouple junctions or other printed product condition sensors that may be calibrated for use as temperature sensors. The sensing interfaces are miniaturized and may be as small as several microns in length. The sensors are capable of making multiple measurements with a spatial resolution of less than 1 mm. Such non-invasive, multi-point sensing capabilities allow the measurement of a product condition gradient in a small space with minimum disturbance of the measured gradient.

Figure 2:
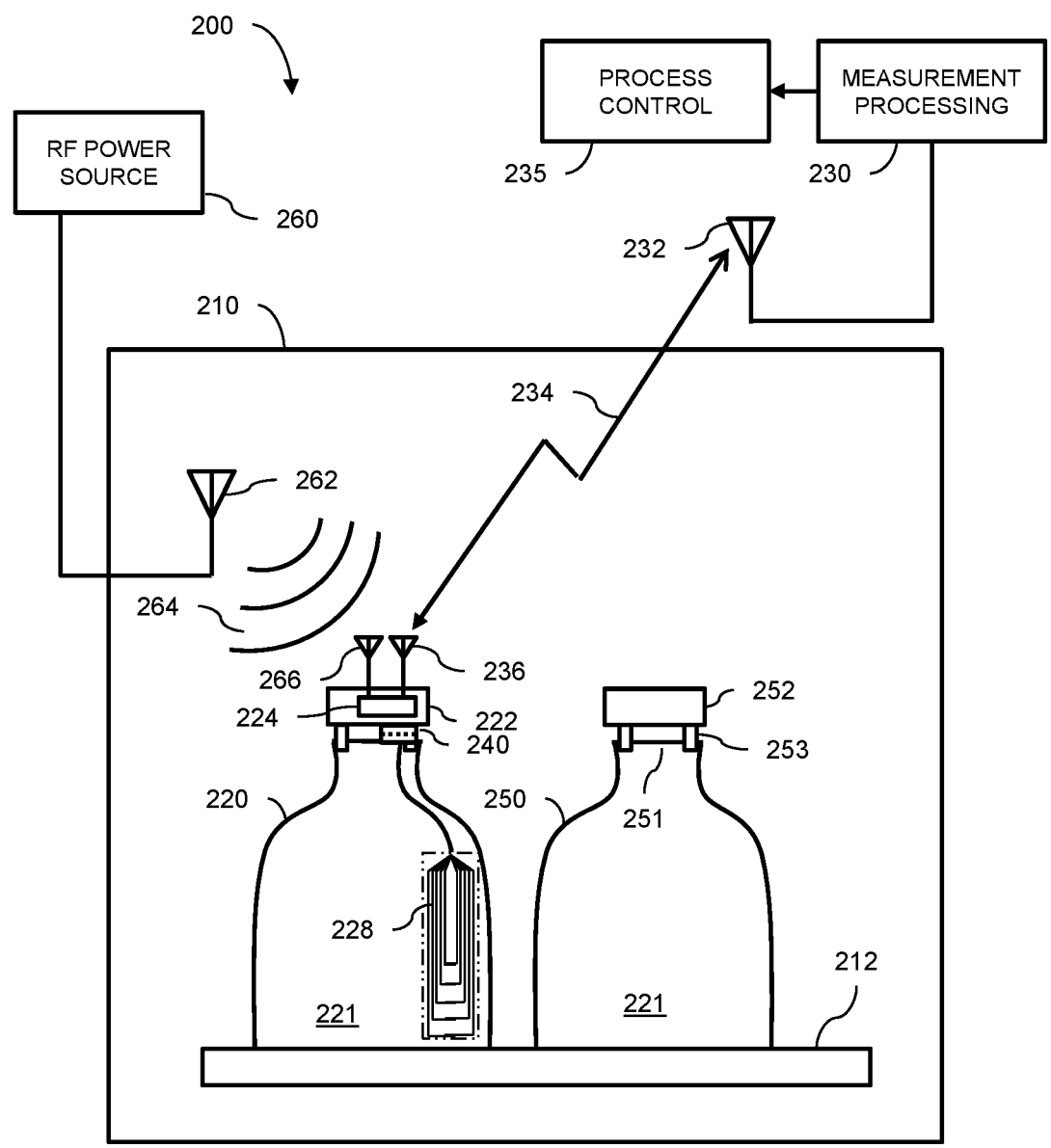
FIG. 2 is a schematic drawing of a freeze drying system according to one aspect of the disclosure.
Figure 3:
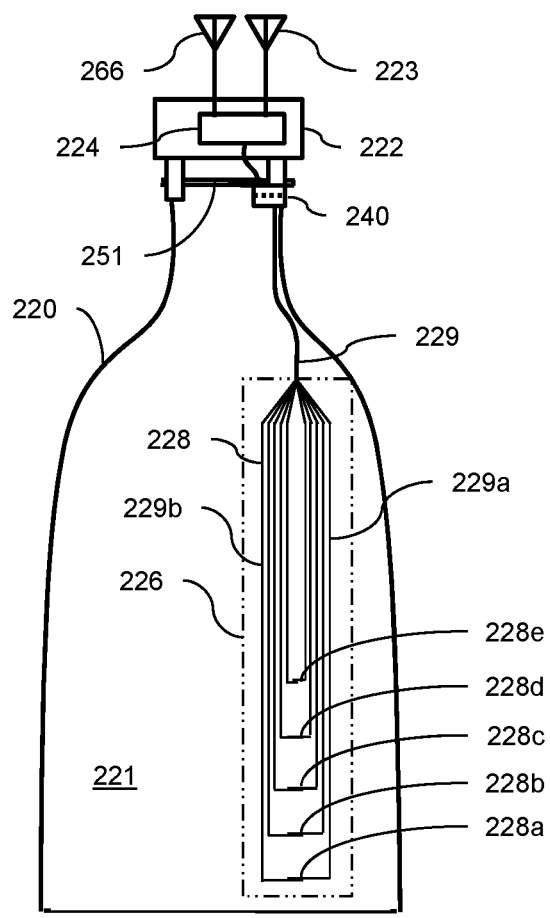
FIG. 3 is a schematic view of a measurement product vial assembly with process monitoring apparatus according to one aspect of the disclosure.

A freeze drying system 200, including a measurement product vial 220 fitted with product condition sensors 228 in accordance with embodiments of the present disclosure, is shown schematically in FIGS. 2 and 3. Systems in accordance with the disclosure will be described with reference to those figures.

A product drying chamber 210 is connected with equipment (not shown) for evacuating the interior of the chamber 210 and for controlling the temperature of product contained in the chamber, such as by heating a shelf 212. Product vials 220, 250 are supported by the shelf 212 and contain product 221 to be freeze dried. The product vial 250 is fitted with a closure 252. The closure 252 may be in a raised position, as shown, wherein closure legs 253 or other means support the closure in an open condition in the product vial opening 251, allowing solvent vapor to escape during the freeze drying process. After the freeze drying process is completed, the closure is pressed downward to a fully seated position, closing the opening 251. Standard closures 252 are available in several designs, each with its own geometry and vapor flow characteristics.

The measurement product vial 220 is equipped with a special closure 222 (FIGS. 2 and 3) that supports a printed circuit board 224 with circuitry as described below, and signal receivers 266, 236. The measurement product vial 220 is additionally fitted with a product condition sensor 228 that is electrically connected to the printed circuit board 224 via a connector 240. A freeze drying system in accordance with embodiments of the disclosure may contain tens of thousands of vials during a processing cycle. A selected subset of those vials are measurement product vial assemblies including measurement product vials fit with product condition sensors 228 and special closures 222; the remaining vials are closed using standard closures 252. The particular subset of vials that is fit with the product condition sensors 228 is chosen to provide an optimum map of product conditions in the chamber 210.

The special closure 222 is designed to match the geometry and vapor flow characteristics of the other closures 252 used in the freeze drying system. In that way, product condition profiles of neighboring vials may be estimated using information from a single instrumented vial.

The product condition sensor array 228 comprises a plurality of bimetal junctions 228a through 228e, which may be arranged in a linear array as shown in FIG. 3. The sensor array comprises pairs of dissimilar metallic lead strips 229a, 229b that are connected at the junctions 228a-e. The sensor array 228 is located on an interior surface of the vial 220 such that the sensor array measures a product condition profile, such as a temperature profile, at spaced apart locations within the product 221. While five bimetal junctions 228a-228e are shown in FIG. 3, more or fewer junctions may be used depending on the desired resolution of the measured profile, and on the physical size of the sensors. In one example, seven evenly spaced thermocouples monitor temperature along a line in the product fill in the measurement product vial 220.

The presently disclosed sensors utilize metallic strips that are deposited on a substrate to work as a thermocouple junction or another sensor type. In embodiments, the junctions 228a-228e, shown in FIGS. 2 and 3, are deposited on a flexible film substrate 226 having a thickness of less than 30 microns. The film substrate 226 is mounted on an interior surface of the measurement product vial 220, as shown in FIGS. 2 and 3. The junctions have a length on the order of microns to minimize the invasive nature of the monitoring tool.

Figure 3A:
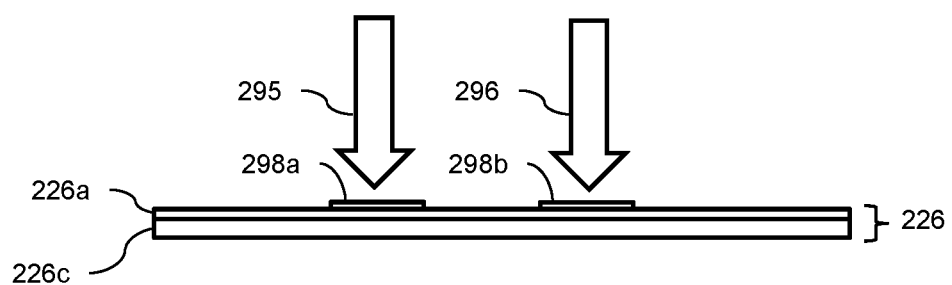
FIG. 3a is a schematic view of an inkjet printing process according to one aspect of the disclosure.

The flexible film substrate 226 may be a non-silicone film such as a polypropylene film available from MIRWEC Film, Inc., 601 South Liberty Drive, Bloomington, Ind. 47402. In one example, the bi-metal sensors 298a, 298b (FIG. 3a) and leads are deposited using a roll-roll ink jet printing process on a polypropylene film 226a having a thickness of between 12 and 30 microns. An inkjet printing process is a digital printing technique that recreates an image by propelling droplets of ink using nozzles 295, 296 toward the substrate 226 and distributing those droplets on the substrate according to digital instructions. The ink dries on the substrate through evaporation of ink components, or chemical interaction with the atmosphere or the substrate, or a chemical reaction among components of the ink. Other techniques, such another digital or non-digital printing technology, may alternatively be used to deposit the sensors on the film.

Figure 3B:
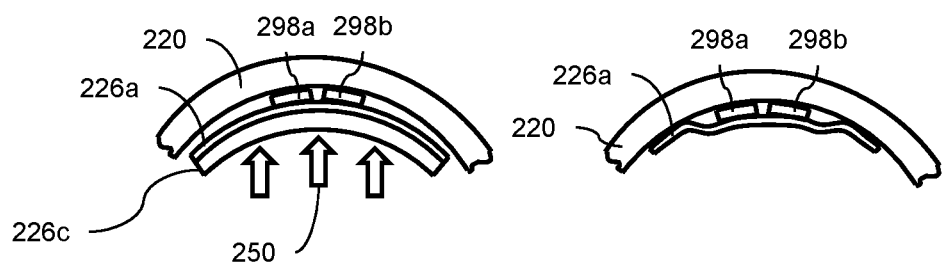
FIG. 3b is a schematic view of a product measurement vial showing application of printed product condition sensor elements according to one aspect of the disclosure.

The polypropylene film 226a may have a PET backing 226c, having a thickness of between 25 and 100 microns. The polypropylene film 226a with printed sensor elements 298a, 298b may be applied to the interior surface of the vial 220 using a contoured tool to apply pressure 250 and to assure even contact with the vial, as shown in FIG. 3b. The sensor elements 298a, 298b may be interposed between the film 226a and the interior surface of the vial 220. The PET backing 226c is then removed, leaving the sensor elements 298a, 298b, together with the polypropylene film layer 226a. In one embodiment, no adhesive is used, and the film 226a attaches to the internal surface of the vial as a result of the natural adherence of the smooth surfaces to each other. In other embodiments, an adhesive (not shown) is used to attach the film to the vial.

In one example, the two metals forming the bimetal junctions are silver and palladium. An ink jettable silver nanoparticle ink is available, for example, from Sun Chemical Corp., 35 Waterview Boulevard, Parsippany, N.J. 07054, USA. A palladium ink is available from Gwent Electronic Materials LTD., Monmouth House, Mamhilad Park, Pontypool NP4 OHZ, UK. The metal nanoparticle inks are deposited using an ink jet printing process, and may subsequently be sintered or cured so that the nanoparticles join together and form a continuous structure that allows for conductivity. Other possible bi-metal combinations include copper and constantan and other known metal combinations that may be formulated as nanoparticle, ink jettable inks and deposited on the base substrate.

Figure 4:
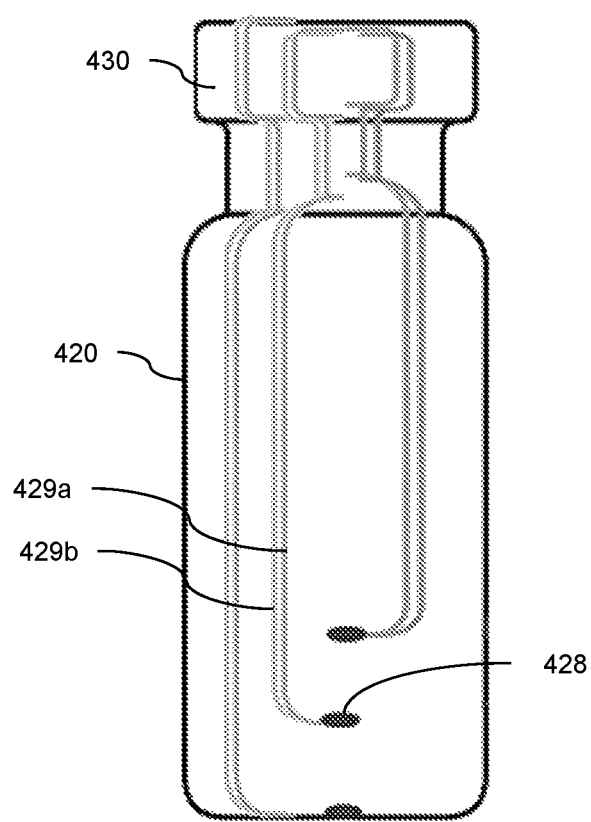
FIG. 4 is a schematic view of a measurement product vial assembly with product condition sensors according to another aspect of the disclosure.

In other embodiments, the substrate is a glass containment vial 420, as shown in FIG. 4. The leads 429a, 429b and the junctions 428 may be deposited directly on an interior surface of the vial using an ink jet printing process such as that described above. Alternatively, a metal deposition process such as a thin film sputtering process may be used. Sputtering is a process whereby particles are ejected from a solid target material by bombardment of the target by energetic particles. The ejected particles are deposited on the substrate.

In the case where the product condition sensors are thermocouples, deposition thickness and the metals chosen will affect the thermoelectric response of the sensing system. Because thermocouples measure a temperature differential between opposite ends of the leads, a calibration sensor may be placed at the reference ends 430 of the thermocouple leads to scale the measurements. If certain more reactive metals such as copper are used to form the thermocouple elements, a thin, $SiO_2$-like sealing film (not shown) may be deposited over the elements to prevent chemical interaction between the thermocouple elements and the product. Similar techniques may be used with other types of product condition sensors, such as humidity sensors.

In embodiments of the disclosure, the individual sensors may require less than 2 mm of space between adjacent sensors. Six or more such sensors may therefore be placed in a 12 mm measurement line at different distances from the bottom of the vial, permitting the measurement of a product condition profile with relatively high resolution. In another embodiment, one or more sensors are placed on the bottom surface of the vial.

Returning to FIG. 3, the sensor array 228 is sampled using electronics built into the special container closure 222. The sensing system is powered using a radio frequency energy harvesting board 266 as described below. One or more printed circuit boards 224 may comprise processing and connecting circuitry as well as signal receivers 266, 236. In one example, the radio frequency harvesting board 266 may be a separate printed circuit board from the board 224 containing the processing and connecting circuitry. The circuit board 224 may be constructed integrally with, or mounted on, the special closure 222.

Figure 5:
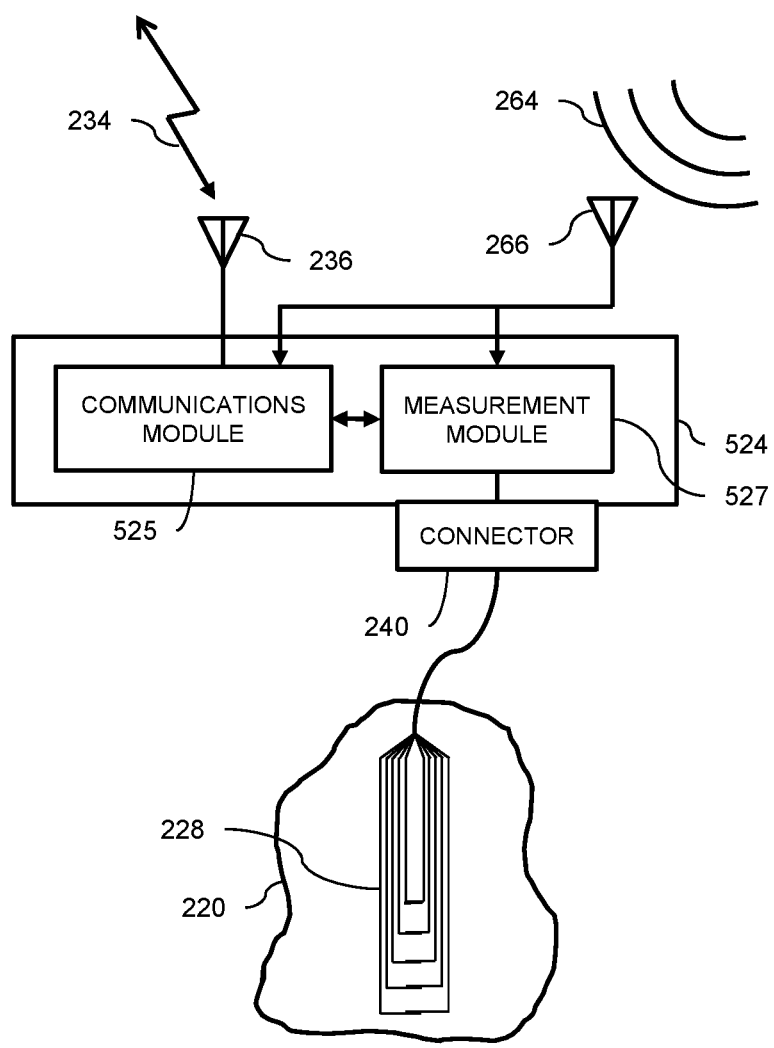
FIG. 5 is a schematic drawing showing electronic components of a measurement product vial according to one aspect of the disclosure.

As shown in FIG. 5, one or more processors 524 mounted on the printed circuit board 224 (FIG. 2) include a measurement module 527 that receives measurements from the sensors 228 and converts those measurements to data useable by other components of the freeze drying system. The measurement module 527 may include specialized circuitry for measuring voltage or another characteristic from the sensors 228. The measurement module 527 may include a software module for storing values such as calibration values and for converting voltage measurements into temperature measurements.

The sensors 228 may be wired to the measurement module 527 via a connector 240. In one exemplary embodiment, terminals connected to the sensors are deposited on the vial near the opening 251 (FIG. 3). Upon installation of the special container closure 222 in the vial opening 251, those terminals engage terminals on the special container closure that are connected to the measurement module 527. Other connector arrangements will be apparent to those skilled in the art.

A communications module 525 (FIG. 5) is also included in the processor 524 and manages the transmission of data from the measurement module 527 to a measurement processing module 230 (FIG. 2) located outside the chamber 210. The communications module 525 performs communications tasks using a sensor sampling protocol such as the ANT™ open access multicast wireless sensor network protocol. Measurements received from the measurement module 527 are wirelessly transmitted by the communications module 525 using a data transmission antenna 236 via a signal 234 utilizing the industrial, scientific and medical (ISM) band (2.4 GHz) of the radio spectrum, and received outside the product drying chamber 210 by the measurement processing module 230 via a communications antenna 232.

The sensors 228 may be calibrated individually at known product condition calibration points. The resulting calibration coefficients and offsets may be stored in the measurement module 527. Alternatively, calibration information for individual sensors 228 in the sensor system may be stored with corresponding unit ID codes in a database accessible to the measurement processing module 230 located outside the product drying chamber.

The communications module 525 (FIG. 5) utilizes a unique ID code to identify itself to the measurement processing module 230 (FIG. 2). Initial loading of the vials 220, 250 onto the shelves 212 of the product drying chamber 210 is done in such a way that locations of the measurement product vials 220 having product condition measurement sensors are known and tabulated. In an auto loading system using one or more loading tracks, positions along the tracks can be traced to locations on the shelves within the freeze drying chamber 210. Upon the receipt of a measurement by the measurement processing module 230, the unique code is then correlated to the location of the measurement product vial 220 within the chamber 210, allowing the received product condition measurements to be mapped to that location for analysis and process control.

Processed measurement data from the measurement processing module 230 is transmitted to other modules for use. For example, the data may be transmitted to a process control module 235 (FIG. 2) for real-time control of the freeze drying process based on temperature data. The temperature data may alternatively be transferred to a data analysis module for process development, scaling up and quality analysis.

The techniques described herein may be performed in part by a discrete processor, an industrial controller or a computer used in conjunction with the described processing equipment. For example, the process control module 235 may reside in a programmable logic controller (PLC) that has operating logic for valves, motors, etc. The measurement processing module 230 may reside in a personal computer (PC) or a PLC or both. Communications with the communication modules 225 (FIG. 5) may be handled by a USB ANT™ plug-in module that includes an integral communications antenna and firmware for sampling the measurement processing modules and forwarding the received information to the host PC. Such modules may utilize single-chip ANT™ connectivity ICs such as are available from Nordic Semiconductor® of Oslo, Norway. Data acquisition may alternatively be performed by other specialized devices or by using short range communication capabilities of standard devices such as a tablet or a smart phone.

Figure 1:
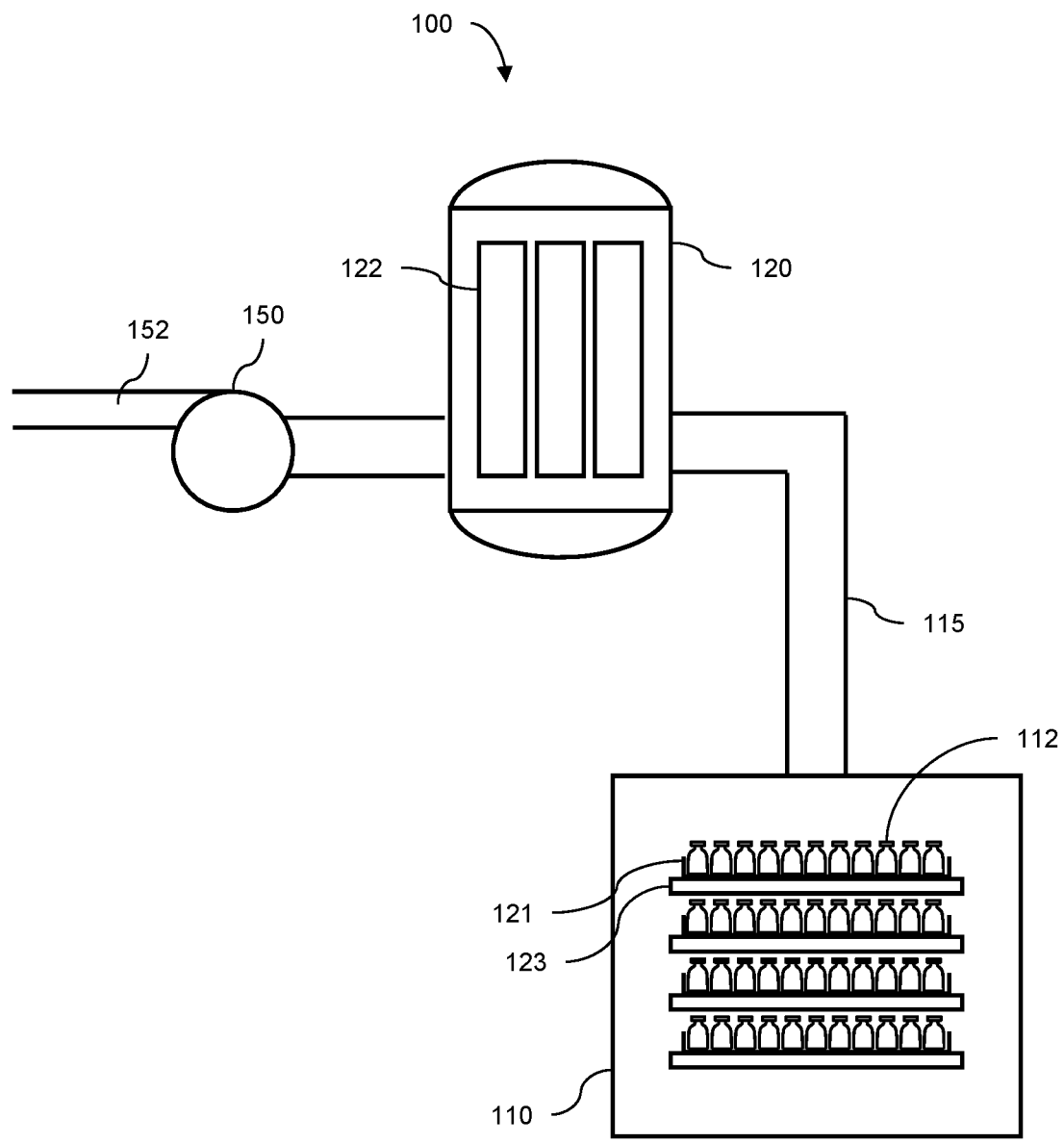
FIG. 1 is a schematic drawing of a prior art freeze drying system.

The printed circuit boards 224, as well as the PLC and the PC, include central processing units (CPU) and memory. The PLC and the PC also comprise input/output interfaces connected to the CPU via a bus. A PLC is typically connected to the processing equipment via the input/output interfaces to receive data from sensors monitoring various conditions of the equipment such as temperature, position, speed, flow, etc. The PLC is also connected to operate devices that are part of the equipment, such as the vacuum pump 150 (FIG. 1) and thermal fluid circulation in the shelves 212.

The memory may include random access memory (RAM) and read-only memory (ROM). The memory may also include removable media such as a disk drive, tape drive, thumb drive, etc., or a combination thereof. The RAM may function as a data memory that stores data used during execution of programs in the CPU, and is used as a work area. The ROM may function as a program memory for storing a program including the steps executed in the CPU. The program may reside on the ROM, and may be stored on the removable media or on any other tangible, non-transitory computer-readable medium in the PLC or the PC, as computer readable instructions stored thereon for execution by the CPU or other processor to perform the methods disclosed herein.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude propagated signals, which are not tangible and are not non-transitory. Cached information is considered to be stored on a computer-readable medium. Common expedients of computer-readable media are well-known in the art and need not be described in more detail here.

Components on the printed circuit board 224 are wirelessly powered via a radio frequency energy harvesting board 266 (FIG. 2). A radio frequency powering signal 264 is generated by a radio frequency power signal source 260 and transmitted within the chamber 210 using a powering antenna 262 in the chamber. Multiple powering antennae 262 may be used within the chamber to power a large number of PC boards 224 and to establish line-of-sight communication with all radio frequency energy harvesting boards 266. The use of wireless radio frequency powering of the PC boards 224 eliminates the need for power wires and batteries, both of which are problematic in a freeze drying process.

Figure 6:
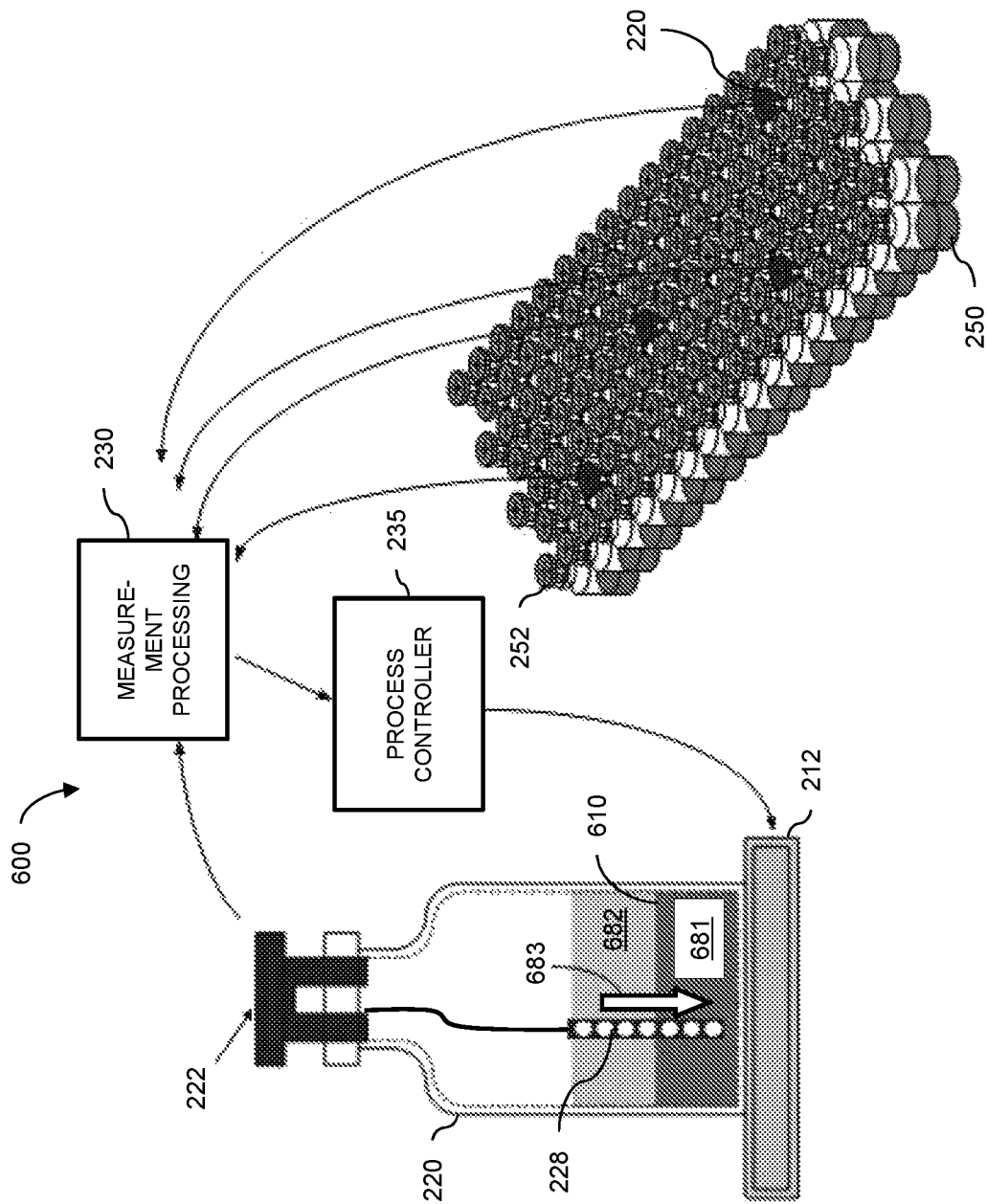
FIG. 6 is a schematic drawing showing monitoring of selected product vials according to one aspect of the disclosure.

A process control arrangement 600, shown in FIG. 6, demonstrates the use of the product condition measurement units to measure product conditions such as temperatures in a subset of the vials 220 and to control the freeze drying process. Of the many vials 250 shown in FIG. 6, only four are measurement product vials 220 fitted with special closures 222 and measurement sensors 228. The remaining vials 250 are fitted with standard closures 252 such as commercially available stoppers made for that purpose.

Choosing the locations of vials with measurement sensors within the product drying chamber may be based on historical measurement data or on qualitative characteristics of the chamber. For example, it may be known that certain locations in the chamber are expected to contain the warmest or coldest vials during a freeze drying cycle, based on data gathered during process development or based on past production data. Vials at those locations are fitted with the measurement sensors.

Measurement data from the sensors is wirelessly transmitted from the vials 220 with the measurement sensors and special closures 222 to the measurement processing module 230. For each such vial, the transmitted data includes a unique ID code that is used by the measurement processing unit 230 to look up a location in the chamber (row, column and shelf) where the measurement was taken.

The processed data is then transmitted to the process controller 235. Using the received measurement data, the process controller 235 can control the freeze drying process in real time to optimize product condition profiles in the vials. In the arrangement 600, the process controller 235 controls the flow of heat transfer fluid to the shelves 212 in the product drying chamber, thereby controlling the transfer of heat to the supported vials. For example, the overall flow of heat transfer fluid to the shelves may be controlled based on the temperature within one or more vials in the chamber. Overall shelf temperature in the chamber may be reduced based on the warmest vial in the chamber.

In another example, the flow of heat transfer fluid to individual shelves or individual regions of shelves is individually controlled. If it is found that sublimation is taking place in vials on a particular shelf at a rate that is behind that of the overall process, the flow rate or temperature of the heat transfer fluid to that particular shelf or region may be adjusted to increase the heat transfer rate from that shelf to the supported vials, and to bring the sublimation rate in those vials back in line with the overall process.

The tightly arranged sensors 228 enable the precise measurement of gradients along the product fill in the containment. Each measured vial contains up to three or more thermocouple sensors, and a large number of vials with product condition sensors 228 may be deployed (maximum theoretical limit $2^{32}$) throughout the load matrix of tens of thousands of identical vials in the product drying chamber. By using an ink jet printing process to produce the product condition sensors, the cost of the sensors is minimized, permitting a large number of vials to be fitted with the sensors.

As the product dries, a sublimation front 610 propagates through the vial along a drying vector 683 (FIG. 6). In each vial, the sublimation front 610 separates frozen product 681, containing frozen water, from dry product 682 wherein the freeze drying process has been completed. As the freeze drying process progresses, the temperature of the front increases due to increasing resistance offered by it to mass transfer of the solvent vapor. Tracking the sublimation front can be a useful process analytical technique to quantify end of drying, or product uniformity characterization, which are critical to process characterization.

Current technology allows measurement of only a single temperature point, which, in turn, leads to conservative process control because the measurement is not at the ice interface until near the end of the process. In contrast, the presently described technique is capable of providing a high spatial resolution temperature profile along the product fill. That characteristic may be used to advantage in precisely locating the sublimation front during processing.

Figure 7:
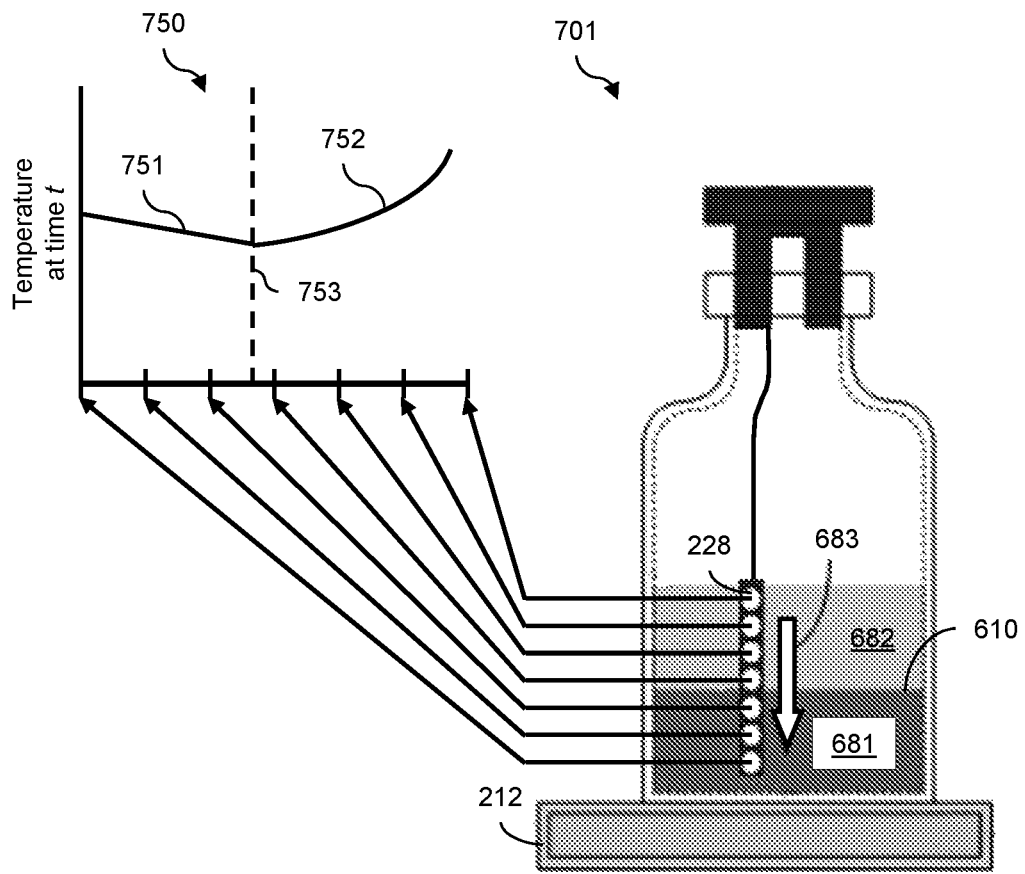
FIG. 7 is a schematic graph showing a temperature profile within a product vial according to one aspect of the disclosure.

In the example process 701 shown in FIG. 7, a sublimation front 610 is propagating along a drying vector 683. The sublimation front 610 separates frozen product 681 from dry product 682 during a freeze drying process. A theoretical single scan of temperature measurements, at a given time t, from the sensors 228 is shown in a graph 750. In the example shown, a temperature profile 751 in the frozen product 681 shows a higher temperature measured by the sensors closer to the shelf 212 and decreasing temperatures toward the line 753 representing the sublimation front 610. The temperature profile 752 of the dry product 682, on the other hand, increases with distance from the frozen product below. The temperature profile shown in the graph 750 is merely exemplary, and the exact profile for a given process will vary for different process rates, different product types and different vial geometries.

It can be seen that an analysis of the temperature profile along the drying vector within a vial will yield a location of the sublimation front. The analysis may comprise, for example, the determination of a maximum, a minimum, a point of inflection, a discontinuity, or another parameter. The sublimation front may alternatively be located using a similar analysis of another product condition, such as humidity.

Using current communications technology, the sensors may be sampled at rates up to one sample per microsecond. Multiple samples in a given vial over time may be employed to determine a maximum or a minimum rate of change along the profile, or another time-domain parameter that may be used to locate the sublimation front. The sublimation front in a particular process may therefore be located using a profile-based parameter, a rate-based parameter, or another parameter derived from the measurements. The best parameter to use in a particular process may be determined theoretically or experimentally.

A propagation rate of the sublimation front along the drying vector may also be determined and used to control the process.

Figure 8:
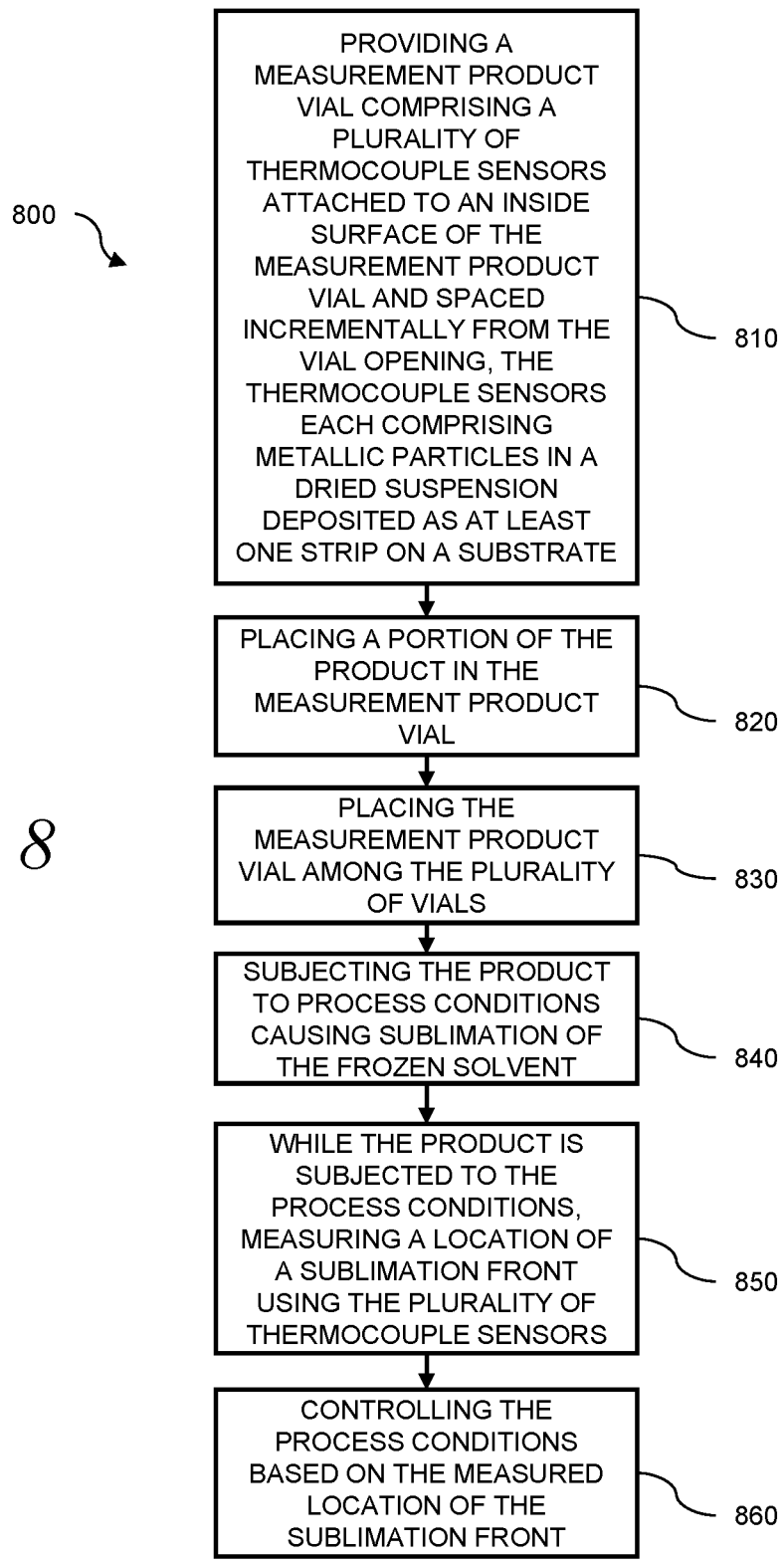
FIG. 8 is a flow chart showing a method in accordance with one aspect of the disclosure.

Embodiments of the present disclosure include a method 800 for freeze drying a product containing a frozen solvent, which is described with reference to FIG. 8. The product is contained in a plurality of vials arranged on a shelf in a product drying chamber.

A measurement product vial is provided at operation 810. The measurement product vial includes a plurality of product condition sensors attached to an inside surface of the measurement product vial and spaced incrementally from the vial opening. The product condition sensors each comprise metallic particles in a dried suspension deposited as at least one strip on a substrate. A portion of the product is placed in the measurement product vial at operation 820.

In operation 830, the measurement product vial is placed among the plurality of vials. In the case where a plurality of vials is monitored, each measurement product vial has a unique ID code and a correlation of ID codes with locations within a product drying chamber is recorded.

The product is subjected to process conditions causing sublimation of the frozen solvent at operation 840. While the product is subjected to the process conditions, a location of a sublimation front is measured using the plurality of product condition sensors, at operation 850. The location may be determined by estimating a product condition gradient based on product condition measurements of the product. In operation 860, the process conditions are controlled based on the measured location of the sublimation front.

Embodiments of the present disclosure additionally include a method 900 for preparing a container for measuring a temperature profile in a product contained in the container, which is described with reference to FIG. 9. An ink jet is directed onto a flexible substrate at operation 910 to print strips on the substrate. The ink jet comprises metallic particles in a liquid suspension; the strips form a plurality of bimetal thermocouples. The flexible substrate with the sensor elements is applied at operation 920 to an interior surface of the container. The plurality of bimetal thermocouples is electronically connected at operation 940 to electronics for measuring the temperature profile.

The proposed solution can monitor a large number of installed probes simultaneously using a multi-network functionality, and adjust the process conditions, such as heat transfer rate to the vials, based on the warmest probe, or based on a spatial analysis of readings from throughout the chamber, in order to maintain the optimal conditions. The system will also detect for each sensor a rapid temperature (or other product condition) shift associated with the passage of the sublimation front, and adjust process control based on output.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A container apparatus for processing a product, comprising:
   a product containment vial having an interior surface for contacting the product and defining a product containment space in communication with an exterior of the product containment vial via a vial opening; and
   a plurality of product condition sensors on the interior surface, the product condition sensors being incrementally spaced from the vial opening for measuring a condition profile of the product within the product containment space, the product condition sensors each comprising metallic particles in a dried ink suspension deposited as at least one strip on a substrate wherein the substrate is a flexible film applied to the interior surface of the product containment vial, and the product condition sensors are interposed between the substrate and the interior surface of the product containment vial.

2. The apparatus of claim 1, wherein the product condition sensors are thermocouples each comprising two strips having metallic particles of different types, and the condition profile of the product is a temperature profile.

3. The apparatus of claim 1, wherein the at least one strip is deposited on the flexible film using a roll-roll inkjet printing process.

4. The apparatus of claim 1, further comprising:
   a processor connected for receiving measurements from the product condition sensors and transmitting measurement data via a local wireless network; and
   a radio frequency energy harvesting board connected for powering the processor using a received wireless powering signal.

5. The apparatus of claim 4, further comprising:
   a closure positioned in the vial opening, the processor and the radio frequency energy harvesting board being supported by the closure.

6. The apparatus of claim 5, further comprising:
   a disengageable electrical connector connecting the product condition sensors to the processor.

7. The apparatus of claim 4, wherein the local wireless network utilizes an ANT™ communications protocol.

8. The apparatus of claim 4, wherein the processor is configured to transmit a unique network ID of the container apparatus via the local wireless network.

9. The apparatus of claim 4, further comprising:
   a communications antenna connected to the processor to transmit the measurement data via the local wireless network.

10. The apparatus of claim 9, wherein the processor, the radio frequency energy harvesting board and the communications antenna are mounted on a common printed circuit board.

11. The apparatus of claim 1, wherein adjacent ones of the plurality of product condition sensors are spaced apart less than 2 mm.

12. The apparatus of claim 11, wherein the plurality of sensors comprises more than two sensors.

13. The apparatus of claim 11, wherein the plurality of sensors comprises more than six sensors.

14. A method for preparing a container for measuring a temperature profile in a product contained in the container, comprising:
   directing an ink jet onto a flexible substrate to print strips on the substrate to form a flexible substrate with deposited bimetal thermocouples, the ink jet comprising metallic particles in a liquid suspension;
   after directing the ink jet onto the flexible substrate, applying the flexible substrate with deposited bimetal thermocouples to an interior surface of the container, the interior surface of the product containment vial being for contacting the product, and the deposited bimetal thermocouples being interposed between the substrate and the interior surface; and
   electronically connecting the bimetal thermocouples to electronics for measuring the temperature profile.

15. The method of claim 14, wherein the strips form an array of at least six bimetal thermocouples.

16. The method of claim 14, wherein the flexible substrate is a polypropylene film.

17. A system for aseptic processing of a product, comprising:
   a processing chamber including an arrangement for supporting a plurality of product vials;
   a measurement product vial assembly comprising:
      a measurement product vial for containing a portion of the product the measurement product vial having an inside surface for contacting the product;

a plurality of product condition sensors at a plurality of locations spaced incrementally from an opening of the measurement product vial and attached to the inside surface of the measurement product vial for measuring a condition of the product in the measurement product vial, the product condition sensors comprising first and second metallic strips comprising metal-containing inks printed on a substrate, wherein the substrate is a flexible film applied to the inside surface of the measurement product vial, and the first and second metallic strips being interposed between the flexible film and the inside surface of the measurement product vial;

a processor connected for receiving measurements by the product condition sensor and transmitting measurement data via a local wireless network; and a radio frequency energy harvesting board connected for powering the processor using a received wireless powering signal;

a radio frequency power transmission system for powering the radio frequency energy harvesting board within the processing chamber via the wireless powering signal; and a wireless communications transceiver configured for communications with the processor via the local wireless network.

18. The system of claim 17, wherein the product condition sensors are thermocouples.

19. The system of claim 17, wherein the metal-containing inks are printed on the flexible film using a roll-roll inkjet printing process.

20. The system of claim 17, wherein the first and second metallic films comprise metallic films deposited on the inside surface of the measurement product vial.

21. The system of claim 17, further comprising:
environmental control apparatus connected for controlling environmental conditions within the processing chamber based on the measurement data.

22. The system of claim 17, further comprising a plurality of measurement product vial assemblies, wherein each measurement product vial assemblies of the plurality of measurement product vial assemblies utilizes a unique network ID in the communications with the wireless communications transceiver.

23. The system of claim 17, wherein the arrangement for supporting the plurality of product vials comprises a plurality of shelves, each individual shelf having an individual adjustable heat transfer system for transferring heat from the shelf to vials supported by the shelf, and wherein the individual adjustable heat transfer system of an individual shelf is regulated based on measurement data pertaining to a measurement product vial supported by the individual shelf.

* * * * *